May 27, 1930. W. MILLER 1,760,765
ROLLER CLUTCH
Original Filed Feb. 3, 1927   2 Sheets-Sheet 1

Inventor:
William Miller:
By Maddox
Attorney.

May 27, 1930. W. MILLER 1,760,765
ROLLER CLUTCH
Original Filed Feb. 3, 1927   2 Sheets-Sheet 2

Inventor
William Miller,
By Emil Bonnelycke
Attorney

Patented May 27, 1930

1,760,765

UNITED STATES PATENT OFFICE

WILLIAM MILLER, OF DUNSTON-ON-TYNE, ENGLAND

ROLLER CLUTCH

Original application filed February 3, 1927, Serial No. 165,668, and in Great Britain February 17, 1926. Divided and this application filed June 21, 1928. Serial No. 287,234.

This invention relates to roller clutches and is a division of my prior application Serial No. 165,668, filed 3rd February, 1927, now Patent No. 1,735,125, granted November 12, 1929.

The invention relates to roller clutches wherein one of the clutch members (hereinafter referred to as the "roller carrying member") has associated therewith one or more roller units each comprising an even number of rollers arranged in a line substantially transverse of the direction of movement of the clutch members, the said roller units co-operating with cam or wedge surfaces, so that when one of the clutch members is moved, a virtual toggle action occurs between the rollers and clutch members with a consequent effective engagement.

The object of the invention is to provide a modified form of clutch in which the action of the clutch may be made faster or slower to suit particular circumstances.

The invention will now be described with reference to the accompanying drawing, in which Fig. 1 is a semi-diagrammatic view showing the effect of the offset with the centre line of the offset passing to the right of the axis of the clutch.

Figure 1:
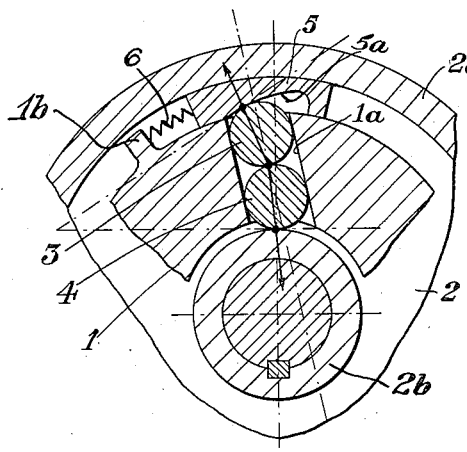
Figure 2:
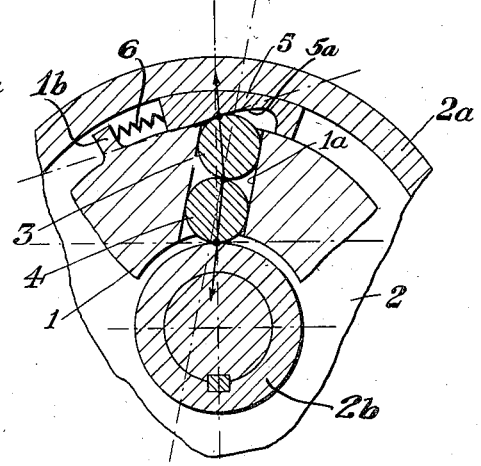
Fig. 2 is a similar view to Fig. 1 showing the offset passing to the left of the axis of the clutch.

Referring more particularly to Figs. 1 and 2 of the drawing, 1 is the roller carrying member which takes the form of an annulus, 2 the other clutch member, 3, 4 a pair of rollers comprising a roller unit, and 5 a movable wedge arranged between the roller 3 and the flange 2$^a$ of the member 2 which comprises a disk provided with two concentric flanges 2$^a$, 2$^b$. A spring 6 is interposed between an abutment 1$^b$ on the member 1 and the wedge 5 to maintain the latter against the roller 3. The roller cavity is in the form of a slot 1$^a$ offset to the right of the clutch axis in Fig. 1, and to the left in Fig. 2, the direction of incline of the wedge surface remaining the same in both cases. The angle of offset in both cases is about 12°.

The action of the clutch is as follows:—
When the roller-carrying member 1 is turned in a counter-clockwise direction, the rollers 3, 4 coact at once between the flange 2$^b$ and the wedge surface 5$^a$, owing to the spring 6 maintaining the wedge 5 against the roller 3, and form an instantaneous toggle, as shown by the arrow lines, so that the wedge 5 is pressed against the member 2$^a$ and the clutch engages.

In Fig. 1 the tangents at the points of contact between the wedge surface 5$^a$ and the roller 3, and between the roller 4 and the inner face of the flange 2$^b$, are at a greater angle to each other than is the case with a normally disposed cavity, so that with this arrangement a quicker engagement and release is obtained than with the normally disposed cavity. In Fig. 2 the angle of the tangents is less so that engagement and release is slower than with the normally disposed cavity.

Figure 3:
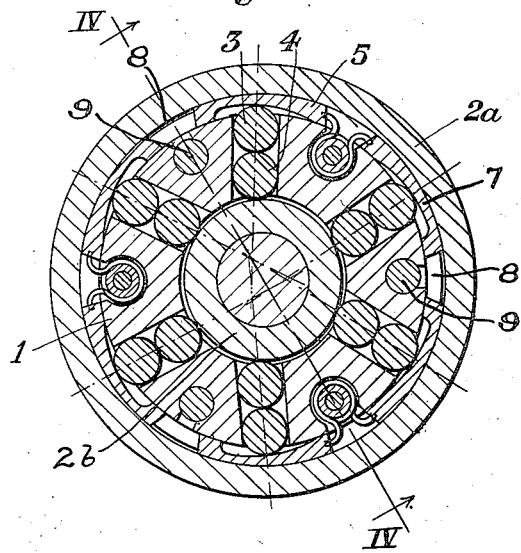
Fig. 3 is a cross-section of a practical form of clutch according to the invention.
Figure 4:
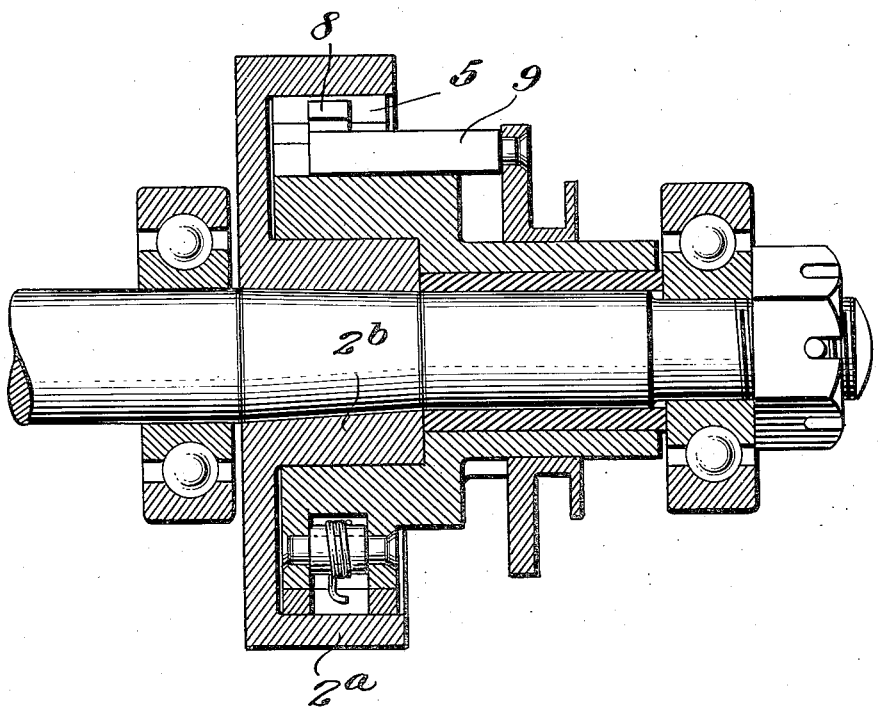
Fig. 4 is a section on the line IV—IV of Fig. 3.

In the practical form of clutch shown in Fig. 3 the offset is arranged as in Fig. 1 for a quick engagement and release, the wedges being arranged in oppositely disposed pairs with the result that the offsets must be similarly arranged.

The pairs of oppositely-disposed wedges are adapted to coact with cams 8 mounted on longitudinally movable pins 9, so that in the inner position of the said cams one set of wedges is non-operative and the other set operative, and vice versa for the outer position of the said cams. However, the arrangement of the wedges forms no part of the present invention.

I claim:

1. A clutch comprising two members, an even number of circumferentially contacting rolling elements arranged in one of said members offset from the normal to the direction of movement of the clutch members, a pair of flanges on the other clutch member, said flanges embracing the outer faces of said rolling elements, and camming means on one of the clutch members, said camming means being independent of said rolling elements, with which camming means the said rolling elements are adapted to cooperate so that when one of the clutch members is moved the clutch is engaged.

2. A clutch comprising two members, an even number of circumferentially contacting rolling elements comprising a plurality of units each containing an even number of said elements arranged in one of said members offset from the normal to the direction of movement of the clutch members, a pair of flanges on the other clutch member, said flanges embracing the outer faces of said rolling elements, and camming means on one of the clutch members, said camming means being independent of said rolling elements, with which camming means the said rolling elements are adapted to cooperate so that when one of the clutch members is moved the clutch is engaged.

3. A clutch comprising a disc having two concentric flanges thereon, an annulus disposed between said flanges and having a plurality of cavities therein offset from the normal to the direction of movement of said disc and annulus, an even number of circumferentially contacting rolling elements located in said cavities, a plurality of spring pressed wedges adapted to slide between one of the disc flanges and the annulus, each of which wedges has its inclined face adapted to abut against one of said rolling elements located in said cavities.

4. A clutch according to claim 1 wherein the angle of the offset from the normal is about 12 degrees.

In witness whereof I have signed this specification.

WILLIAM MILLER.